May 24, 1966 E. SAUR 3,252,832

METHOD OF MAKING MAGNETICALLY HARD SUPERCONDUCTING WIRES

Filed July 10, 1962

INVENTOR
EUGEN SAUR
BY
ATTORNEY 3,252,832
Patented May 24, 1966

3,252,832

METHOD OF MAKING MAGNETICALLY HARD SUPERCONDUCTING WIRES

Eugen Saur, Giessen, Germany, assignor to Aktiengesellschaft Brown, Boveri & Cie., Baden, Switzerland Filed July 10, 1962, Ser. No. 208,925
2 Claims. (Cl. 117—227)

Figure 1:
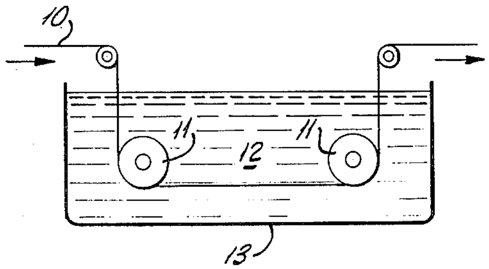

The present invention relates to improvements in the fabrication of superconductor electrical devices, more particularly, though not limitatively, to magnetically hard superconductors comprising a base or core, such as in the form of a wire or the like, having applied thereto a layer of superconductive material composed of a plurality of constituent or component elements.

The known intermetallic magnetically hard superconductors, such as for instance niobium-tin ($Nb_3Sn$) or vanadium-gallium ($V_3Ga$), ordinarily possess a considerable mechanical hardness or brittleness and, for this reason, can be handled or worked only with great difficulty in practice. On the other hand, a great interest exists in the superconductive compositions of this type for use in connection with numerous superconductor applications, primarily on account of the fact that they maintain their superconductivity within the temperature of the liquid helium as superconductifier while being subjected to relatively strong magnetic fields, being of the order of magnitude of about one hundred K oe. for $Nb_3Sn$ and several hundred K oe. for $V_3Ga$, respectively. This characteristic is also known as high magnetic hardness of the superconductor compounds, being far in excess of the hardnesses of the constituent parts thereof. As a consequence, composite superconductors of this type are especially suitable for use in the form of wires for the winding of the electromagnet coils employed to produce powerful magnetic fields by means of a persistent circulating current through a superconductor loop, for magnetic screening applications, and many other uses.

There has already been proposed, in the endeavor to solve the problems presented by the mechanical hardness and brittleness of the superconductive materials referred to, a method consisting of introducing a powderous mixture of fine grain tin and niobium at the molecular ratio of 1:3 into a tube of niobium, closing the ends of said tube, and drawing the same down to a relatively small diameter, in the manner similar to the well-known technique of fabricating so-called Wollaston wires (see Kunzler et al., "Phys. Rev. Letters," 6, No. 3, 1961, pp. 89–91). As a result, there is obtained a flexible wire having a desired thickness and being constituted by an inner core of a mixture of niobium and tin and a cover or sheathing consisting of niobium, respectively. This wire is then manipulated into the final utilization shape, such as by winding it into a coil, and thereafter subjected to an annealing process during several hours at a temperature of about 1000° C. in a neutral atmosphere, whereby to cause the niobium and tin within the core of the wire to react chemically and to produce the desired magnetically hard superconductor $Nb_3Sn$. The thus obtained superconductor wire must, however, be handled with great care due to the brittleness and fragility of the niobium stannate. Besides, superconductors produced by means of this method have the great disadvantage that only the core of the wire consists of the desired superconductive compound, while the niobium sheath or cover will recover its normal conductivity under the influence of a relatively weak magnetic field or operating current flowing through the wire, respectively. Furthermore, the fact that it is practically impossible to directly connect the cores of two or more wires with each other, or that connection can be made only via the outer sheath of the wires, makes it necessary to locate the connections or junction points within regions of low magnetic field strength, a requirement being rather difficult to satisfy and highly undesirable in practice.

There has furthermore heretofore been proposed a method of growing $Nb_3Sn$ crystals upon a thin wire by means of a chemical transfer process by decomposition of an unstable niobium and tin compound (see Aviation Week and Space Technology, Oct. 9, 1961, p. 84). This method, among other disadvantages and shortcomings, is relatively complicated and costly, whereby to greatly limit its usefulness in practice.

Accordingly, an important object of the present invention is the provision of an improved method of producing superconductor devices of the type referred to which is substantially free from the aforementioned and related difficulties and drawbacks inherent in the prior methods and techniques.

Among the more specific objects of the invention is the provision of an improved technique or method of fabricating superconductor devices of the type referred to which will ensure an adequate mechanical stability or flexibility of the devices, in particular superconductor wires, though not limited thereto; which will produce devices which can be handled or worked without danger of affecting the characteristics of the superconductive material; and which will enable the devices to be produced efficiently and expeditiously, as well as at relatively low cost, compared with previously known methods and techniques.

With the foregoing objects in view, the present invention, in an effort to avoid the prior difficulties and drawbacks, involves generally the provision of a new method for producing coated superconductor devices of the type referred to, said method consisting basically in the step of forming, physically and/or chemically, a layer of composite superconductor material or composition upon a base or body having the shape of the desired superconductor device, such as a wire or the like, and being constituted by the highest melting point constituent or component of said composition, such as niobium in the case of $Nb_3Sn$, or vanadium in the case of $V_3Ga$ as final superconductor material, respectively. For this purpose, the surface or a fractional portion of the surface of said body is coated with the complementary or remaining constituent, that is, Sn or Ga, respectively, in accordance with the examples mentioned, or a mixture of such constituents if the final superconductor consists of more than two constituents or components. The coating and base metal are then transformed into the final superconductive composition (alloy or compound) by causing the layer material or coating to diffuse into the surface of the base or core at a sufficiently high diffusing temperature to thereby result in a final coating or layer having a desired thickness and consisting of the composite superconductive alloy or compound, in a manner as will become further apparent as the following description proceeds.

In effecting the diffusion of the superconductor constituent or mixture of constituents into the base or core metal consisting of the complementary constituent of the final superconductive material, the diffusion temperature may be between 900 and 1200° in the example mentioned. In general, the diffusion temperature and treating time are advantageously chosen such as to prevent the diffusion component or components to reach the center of the core or body, in an effort to retain the desirable mechanical properties of the high melting point, solid, tough and flexible core or wire and to ensure its easy handling and working, in particular the winding into a coil, in accordance with the underlying object and purpose of the invention.

As is well known, in superconductor devices, due to their practically zero conductivity, the so-called skin effect is extended down to the lowest frequencies, including zero frequency or D.C. current, wherefor the advantage of using coated wires or conductors of the type forming the basis of the present invention.

Figure 2:
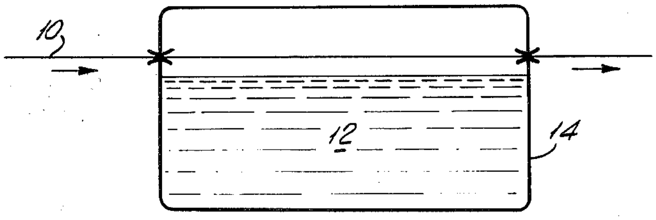

The inventive method, both as to its ancillary objects and novel aspects, will be better understood from the following detailed description, taken in conjunction with the accompanying drawing forming part of this specification and in which:

FIG. 1 is a diagrammatic view of a device for producing superconducting wires according to the invention; and FIG. 2, being similar to FIG. 1, illustrates an alternative method for practicing the invention.

A major field of application of the invention relates to the fabrication of flexible superconducting wires or wires being coated with a superconductive composition, such as $Nb_3Sn$ and $V_3Ga$, as described in greater detail in the following. According to one embodiment of the invention, as illustrated by FIG. 1, such wires may be produced simply and efficiently by immersing a niobium wire 10, having a melting point of 1950° C., in a molten bath 12 of tin having a melting point of 232° C. Advantageously, the wire is passed through the bath of tin or equivalent metal in a continuous operating process, preferably in a vacuum or inert atmosphere by suitably guiding the wire by means of guide rollers 11 supported by the container 13 containing the molten tin or the like coating metal. The temperature of the bath may be maintained between 900 and 1200° C., preferably at 1000° for average practical purposes. As is understood, in the case of producing $V_3Ga$ superconductors, the wire 10 consists of vanadium and the bath 12 of molten gallium.

At the instant of immersion of the niobium wire into the molten tin bath, several phenomena occur simultaneously. To begin with, the molten tin diffuses into the surface of the niobium and reacts with the latter to form a superconductive layer of $Nb_3Sn$ upon the niobium core or surface. At the same time, the molten tin in part dissolves the formed $Nb_3Sn$-layer, whereby to reduce the outer diameter of the wire as the treatment is continued. As a consequence, as the immersion time is increased, both the diameter of the remaining niobium core as well as the thickness of the $Nb_3Sn$-layer are decreased. The following table shows the results obtained from practical tests conducted by applicant for varying treating or immersion times by giving the respective diameters (in mm.) of the non-reacted wire core and the thickness of the $Nb_3Sn$-layer (also in mm.) for a niobium wire having an initial diameter of 0.3 mm. and for a treating or diffusion temperature of the tin bath of 1000° C. Similar results are obtained in the case of vanadium as base or core material being treated in a bath of molten gallium, to produce a superconductor layer upon a gallium core or body consisting of $V_3Ga$, in accordance with the example mentioned hereinabove.

| Immersion time (in minutes) | Diameter of niobium core (in mm.) | Thickness of $Nb_3Sn$-layer (in mm.) |
|---|---|---|
| 3 | 0.24 | 0.030 |
| 10 | 0.15 | 0.045 |
| 14 | 0.12 | 0.060 |

The immersion or treating time decreases as the temperature is increased. At about 1200° C., the treating time becomes inconveniently short and below 900° C. the treating time becomes inconveniently long. As is understood, the treatment should not be extended to a point where the reaction has progressed to the center of the core, in order to leave a non-reacted core of base metal having a sufficient diameter to ensure the benefits to be obtained by the invention, or to prevent the attainment of a final body consisting of superconducting material throughout being difficult to work as well as to handle, as pointed out hereinabove.

If desirable or necessary, the remaining thin and non-reacted layer of tin or equivalent material overlying or adhering to the superconducting layer or coating may be removed, such as by subjecting the coated wire or the like coated body to a suitable etching acid. Thus, in the case of tin, removal of the outer non-reacted tin layer may be effected by treating the coated wire or body in hydrochloric acid or subjecting it to the action of a chloride stream.

Superconductor niobium wires having been coated with a layer of $Nb_3Sn$ in the manner described during a treating time of 10 minutes, have been found capable of being bent easily or wound upon a mandril or core of relatively small diameter substantially without the danger of breaking or deleteriously affecting the superconductive characteristics of the material. Only in the case of relatively small winding diameters, say about 5 mm. and below, cracking of the layer could be ascertained, though being invisible to the naked eye. The same applies to gallium coated vanadium wire produced in accordance with the invention.

Instead of immersing the base wire or body in a tin or equivalent bath, it is possible to dispose the wire or object to be coated above the bath 12 in a vacuum oven 14, FIG. 4, to effect diffusion of the tin or gallium vapor into the surface of the wire or body and formation of the superconducting layer in substantially the same manner as described hereinbefore. The treating times and results obtained in using vapor pressure diffusion have been found to be substantially the same as in the case of immersion, although the vapor pressure of the tin at 1000° C. amounts only to about $10^{-3}$ torr.

A further possibility of carrying into effect the invention consists in pre-coating the niobium or equivalent wire or body with a thin layer of tin or equivalent material by means of any of the known coating techniques, such by electroplating, by a vacuum evaporation method, by a rolling-on or drawing process or the like, whereupon the coated body is subjected to heating to cause diffusion of the coating material into the surface of said body and formation of a superconducting layer in the manner described. The heating may be advantageously carried out in a vacuum or in an inert atmosphere using any suitable means or process, such as by the aid of a high-frequency heating coil, or by simply passing an electric current through the wire or equivalent base to be coated.

While in the foregoing the invention has been described with reference to a few specific illustrative embodiments or examples, it will be apparent that the novel method and technique according to the invention may be utilized generally and with equal advantage for the fabrication of other coated composite superconductors in the form of alloys and/or compound and made up of different constituents or components, or mixtures thereof. Furthermore, it is understood that the invention will enable the fabrication of coated superconductor bodies or devices of any desired shape or form, including wires, rods, strips, plates, etc., and consisting of any suitable high melting point base metal or component, such as niobium, vanadium or tantalum, which it is desired to coat at least in part with a composite superconducting layer by diffusion into said base metal of a complementary constituent, or mixture of constituents, such as molten tin, aluminum, indium, gallium, germanium and silicon, to result in the reaction with the base metal, and to form a superconductive layer having a desired thickness in the manner described hereinbefore. In other words, the method or technique proposed by the present invention applies generally and with equal advantage to the fabrication of composite superconductors provided in the form of a layer or coating upon a base metal or core, wherever difficulties are experienced or it becomes undesirable or impossible to utilize a body consisting entirely of a superconductive composition for any reason, as will be understood from the foregoing.

Instead of coating the entire surface of the base or metal core with the superconductive alloy or compound, such as required in the manufacture of superconducting wires or magnetic screening devices or structures, a desired portion only of the surface of the body may be coated in the manner described, such as required for instance in the fabrication of cryotrons and the like superconductor devices operated at extremely low temperatures.

The specific methods described herein by way of example are accordingly to be regarded in an illustrative rather than in a restrictive sense, the invention being susceptible of numerous modifications and variations coming within the broader scope and spirit thereof, as set forth in the appended claims.

I claim:

1. A method of producing superconducting wires consisting of continuously passing a vanadium wire through a bath of molten gallium, to subject the wire to coating by the gallium during a predetermined period, to cause the coated gallium to diffuse into the wire surface such as to produce a final superconducting intermetallic vanadium-gallium layer of desired thickness upon said wire.

2. A method of producing superconducting wires consisting of continuously passing a vanadium wire through an atmosphere of gallium vapor, to subject the wire to coating by the gallium during a predetermined period, to cause the coated gallium to diffuse into the wire surface such as to produce a final intermetallic superconducting vanadium-gallium layer of desired thickness upon said wire.

References Cited by the Examiner

UNITED STATES PATENTS

| | | | |
|---|---|---|---|
| 2,432,657 | 12/1947 | Colbert | 117—107 |
| 2,958,836 | 11/1960 | McMahon | 338—32 |

OTHER REFERENCES

Matthias et al.: "Physical Review," vol. 95, No. 5, Sept. 15, 1954, p. 1435.

Chem. and Eng. News, Feb. 20, 1961, p. 41.

Wiedeman: "Zeitschrift fur Physik," vol. 151, No. 3, pp. 307–327, 1958.

RICHARD D. NEVIUS, *Primary Examiner.*